United States Patent Office 3,804,901
Patented Apr. 16, 1974

3,804,901
PROCESS FOR THE PRODUCTION OF TERTIARY AMINES
Heinz Noeske, Oberhausen-Sterkrade-Nord, and Hans Feichtinger, and Jurgen Falbe, Dinslaken, Germany, assignors to Ruhrchemie Aktiengesellschaft, Oberhausen-Holten, Germany
No Drawing. Filed Nov. 12, 1971, Ser. No. 198,475
Claims priority, application Germany, Nov. 20, 1970,
P 20 57 001.8
Int. Cl. C07c 85/02
U.S. Cl. 260—585 B                15 Claims

ABSTRACT OF THE DISCLOSURE

A highly pure tertiary amine is obtained by reacting a saturated aliphatic alcohol and ammonia in the presence of a hydrogenation-dehydrogenation catalyst. The catalyst is treated with a tertiary amine before its contact with the alcohol to be converted. The contacted catalyst is then used for the amination reaction in a conventional manner.

---

The process of producing tertiary amines by reaction of primary alcohols with ammonia in the presence of a hydrogenation-dehydrogenation catalyst is known (U.S. Pat. 2,953,601). The process is carried out at ordinary pressure, whereby the reaction water is continuously removed as an azeotropic mixture with excess alcohol, and regenerated alcohol is recirculated to the reaction vessel. The yield of tertiary amines is from 58 to 65%. A serious drawback of this known process is that the distribution of the alkyl groups in the reaction product can not be regulated.

According to U.S. Pat. 3,223,734 a two-stage process has been provided in order to overcome the hereinbefore mentioned drawbacks. In this process, a saturated alcohol having 4 to 22 carbon atoms is treated with ammonia in the presence of a hydrogenation-dehydrogenation catalyst in a first stage. To the resulting amine batch consisting essentially of primary, secondary and tertiary amines and unreacted alcohol, further alcohol is added so that it contains the necessary amount of alcohol for the stoichiometric conversion of primary and secondary to tertiary amines. The mixture is treated in a secondary stage at a temperature of between 190 and 230° C. in the same manner as in the first stage, thus converting the primary and secondary amines contained in the reaction product of the first stage to tertiary amines with azeotropic removal of reaction water. In U.S. Pat. 3,223,734 it is set forth that the yield of tertiary amines can amount up to 98%, but experiments carried through by the applicant showed that the resulting tertiary amines do not possess the necessary purity but are contaminated by undesired side products, as for instance acid amides, secondary amines and neutral compounds. It is therefore impossible to work up to the raw amine products resulting from the known process by distillation in order to obtain amines of the high purity necessary for their use in the field of hydrometallurgy. Tertiary amines were obtained whose separating capacity for metal ions were seriously impaired by their content of neutral components (acid amides, nitriles, hydrocarbons and acetals).

It is an object of the present invention to provide an improved process under conditions from which a pure tertiary amine can be obtained with a high yield. This is accomplished with a process for the production of tertiary amines from saturated aliphatic alcohols containing 8 to 22 carbon atoms, which may be substituted with phenyl-, cycloalkyl- or tetrahydrofuryl groups, and ammonia in the presence of a hydrogenation-dehydrogenation catalyst with addition of hydrogen and the continuous removal of water formed during the reaction. The catalyst is treated with a primary, secondary or tertiary amine before its contact with the alcohol to be converted and is used for the amination reaction as is known in the art.

Although primary, secondary or tertiary amines with any number of carbon atoms may be used for the treatment of the catalyst according to the invention, it is advantageous to perform the treatment with a primary, secondary or tertiary amine derived from the alcohol to be reacted, preferably with the tertiary amine to be prepared with the catalyst in order to simplify the working up of the reaction product.

The treating temperature depends upon the melting point of the amine to be used, in most cases the treatment can be performed at ambient or slightly increased temperature. If a solid amine is used, it is only heated above its melting point to a point where it can be easily admixed with the catalyst. The catalyst may be treated with the amine in any convenient manner, however care has to be taken that the treatment is carried through with sufficient amount of amine to wet the entire amount of catalyst herewith. This is generally assured, if it is treated with 50 to 200% by weight of amine, dependent upon the weight of the dry catalyst. The catalyst may for instance be pasted with or suspended in the amine. Excess amine is separated from the treated catalyst.

Conventional hydrogenation-dehydrogenation catalysts based on nickel, cobalt or iron may be treated according to the invention. These catalysts may be used in porous form for instance as Raney-catalysts or in form of carrier-catalysts. The process according to the invention is especially well suited for nickel containing carrier catalysts to which activators may have been added, for instance catalysts of the following composition:

56–57% by weight Nickel and carrier material (trade name: Ruhrchemie-catalyst 55/5)

ca. 25% by weight Nickel and carrier material (trade name: Ruhrchemie-catalyst 55/5)

ca. 50% by weight Nickel and carrier material (trade name: Ruhrchemie-catalyst 50/35)

ca. 52–53% by weight Nickel and carrier material (trade name: Ruhrchemie-catalyst 52/35)

Any straight- and branched-chain aliphatic alcohols with the number of carbon atoms hereinbefore mentioned are suited as starting materials for the process according to the invention, as well as substituted aliphatic alcohols as for instance 3-phenylpropanol-(1), 2-phenylpropanol-(1), hydroxymethylcyclohexane, tetrahydrofurylalcohol. Especially well suited are primary alcohols produced by hydroformylation of olefins, preferably polymer olefins, followed by hydrogenation.

Side reactions leading to the formation of neutral components are substantially prevented owing to the pretreatment of the hydrogenation-dehydrogenation catalysts according to the invention. As has been experimentally determined and shown in the following comparison examples, the aldehyde corresponding to the starting alcohol is instantaneously formed at the contact of the alcohol with an untreated hydrogenation-dehydrogenation catalyst. Furthermore the aldehydes form acetals with the alcohol under reaction conditions, so that not only part of the alcohol which is to be converted to the corresponding amine is lost by this undesired side-reaction, but the distillative separation of the desired tertiary amine is seriously aggravated by the neutral components since the acetals boil in the same temperature range. The side reactions occur to a greater extent, the later the introduction of ammonia begins. However, the neutral components are also formed in large amounts if the ammonia is introduced immediately after addition of the alcohol to the catalyst, thus causing serious difficulties at the distillation of the product. If however the catalyst is treated in the manner according to the invention, disturbing side reactions are substantially prevented, so that the content of neutral components in the raw amine mixture is very small. At the conversion of isononylalcohol with ammonia for instance, the acetal-content of the reaction product was determined to be less than 1%, so that the desired reaction product was obtained with a purity of 99% in a single distillation stage.

The following examples illustrate the process of the invention.

EXAMPLE 1

36.0 isononyalcohol are introduced into a 100 l. reaction vessel charged with 3.6 kg. of a commercially available nickel catalyst (Ruhrchemie-catalyst 55/5). According to the statements of U.S. Pats. 3,223,734 and 2,953,601, 1.28 kg. gaseous ammonia is introduced during a period of 6 hours into the catalyst suspension under vigorous stirring. Reaction water is continuously removed by means of a phase-separator and a reflux cooler connected with the reaction vessel, while the alcohol, which separates as the lower phase, is continuously recirculated to the reaction vessel. After termination of the introduction of ammonia after 6 hours, the reaction mixture is further heated for 3 hours without addition of ammonia. During said final reaction further reaction water is also removed. Water formation is finished after about 3 hours. A weak stream of hydrogen is lead through the reaction vessel during both reaction periods in order to increase the catalyst activity and to accelerate the discharge of the reaction water. After termination of the reaction the catalyst is separated from the reaction mixture by centrifuging and the filtrate is subjected to vacuum distillation. From 31.5 kg. of the resulting raw-amine mixture, 25.4 kg. of tertiary amine with a content of 90% triisononylamine is obtained. This fraction could not be further separated by repeated distillation in the same apparatus.

The triisononylamine obtained showed the following characteristics:

| | |
|---|---|
| Amine-equivalent weight | 425 |
| Content of tertiary amine | 90.1 |
| $D_{20}$ | 0.814 |
| $n_D^{20}$ | 1.4511 |

EXAMPLE 2

A 100 l. reaction vessel was charged with a 3.6 kg. powdered nickel-catalyst as described in Example 1. The catalyst was admixed with 3.0 kg. triisononylamine by stirring. The mashing was carried out at ambient temperature for 15 minutes. After this period 36 kg. isononylalcohol were added and the mixture was heated to 180° C. Thereafter 1.28 kg. ammonia were introduced during a period of 6 hours, while additionally a stream of hydrogen (100 l./h.) was passed through the reaction vessel. After termination of the addition of ammonia, the reaction mixture was subjected for 3 hours to a final reaction. The catalyst was separated from the reaction mixture by centrifuging 34.1 kg. raw-amine mixture were obtained, from which 27.5 kg. tertiary amine with a content of 98% triisononylamine were separated by vacuum distillation.

The triisononylamine had the following characteristics:

| | |
|---|---|
| Amine-equivalent weight | 396 |
| Content of tertiary amine | 98.6 |
| $D_{20}$ | 0.815 |
| $n_D^{20}$ | 1.4501 |

In order to determine the influence of the catalyst on the alcohol in the absence of ammonia, 60 g. of the hereinbefore mentioned nickel-catalyst were heated in a 2 l. round-bottom flask with 1150 g. isononylalcohol for 6 hours to 180° while passing a weak stream of hydrogen through the mixture. The catalyst was then separated therefrom by filtration and the aldehyde- and alcohol-content of the reaction mixture was analyzed. It was determined, that 5.3% of aldehyde had been formed and 45% of the alcohol had not been converted. At the distillative working up of the residual reaction product an oxygen-containing $C_{27}$-component was obtained, which was determined as isononanal-diisononyl-acetal. This compound had been formed in an amount of 40%. The boiling point of 122°/0.05 torr of this acetal was determined in an annular clearance column, while the boiling point of the pure triisononylamine is 124°/0.05 torr. Even with gas-chromatigraphical analysis a differentiation between said both compounds was impossible.

EXAMPLE 3

A 3 l. round-bottom flask was charged with 120 g. of the powdered nickel-catalyst described in Example 1. The catalyst was stirred with 150 g. triisotridecylamine until it was thoroughly wetted. 1200 g. isotridecylalcohol were added and the resulting mixture was heated to 230° under stirring while passing a weak stream of hydrogen (5 l./h.) therethrough. Thereafter 39.8 Nl. ammonia were bubbled through the mixture during 3 hours, whereby the resulting reaction water was continuously removed as described in Example 1. After termination of the addition of ammonia the reaction mixture was subjected for 3 hours to a final reaction, cooled and separated from the catalyst by filtration. 1035 g. of a raw-amine-mixture were obtained, from which 765 g. of a fraction having a content of 97% of the corresponding tertiary amine was separated by vacuum distillation.

The triisotridecylamine obtained had the following characteristics:

| | |
|---|---|
| Amine-equivalent weight | 570 |
| Content of tertiary amine | 97 |
| $D_{20}$ | 0.837 |
| $n_D^{20}$ | 1.4628 |

When the process described in Example 3 was performed without the treatment of the catalyst with an amine according to the invention, triisodecylamine having a purity of only 88% was obtained.

The term V./Vh., "space velocity" was used in this specification is defined as volume of the charge per hour per catalyst volume.

The term "Nl., "standard liter" as used in this specification is defined as volume of a gas under standard conditions of 0° C. and 760 torr.

What we claim is:

1. In a process for the production of a tertiary amine by reacting a saturated aliphatic alcohol with ammonia in the presence of a hydrogenation-dehydrogenation catalyst, and hydrogen, wherein water formed during the reaction is continuously removed, the improvement which comprises precontacting the catalyst with a sufficient amount of said amine to completely wet the catalyst, then reacting the precontacted catalyst with the aliphatic alcohol to be converted.

2. The process as recited in claim 1 wherein the catalyst is precontacted with 50 to 200% by weight of amine based on dry catalyst weight.

3. The process as recited in claim 1 wherein the amine is derived from the aliphatic alcohol.

4. The process as recited in claim 1 wherein the amine is a primary, secondary or tertiary amine.

5. The process as recited in claim 1 wherein the amine is a tertiary amine.

6. The process as recited in claim 1 wherein the catalyst is contacted with the amine at ambient or elevated temperature.

7. The process as recited in claim 1 wherein the catalyst is based on nickel, cobalt or iron.

8. The process as recited in claim 1 wherein the aliphatic alcohol contains 8 to 22 carbon atoms.

9. The process as recited in claim 1 wherein the aliphatic alcohol is substituted by a phenyl, a cycloalkyl or a tetrahydrofuryl group.

10. The process as recited in claim 1 wherein the aliphatic alcohol is an primary alcohol.

11. The process as recited in claim 1 wherein the catalyst is based on nickel.

12. The process as recited in claim 11 wherein the catalyst contains 56 to 57% by weight nickel.

13. The process as recited in claim 11 wherein the catalyst contains 52 to 53% by weight nickel.

14. The process as recited in claim 11 wherein the catalyst contains about 50% by weight nickel.

15. The process as recited in claim 11 wherein the catalyst contains about 25% by weight nickel.

References Cited

UNITED STATES PATENTS

| | | | |
|---|---|---|---|
| 2,365,721 | 12/1944 | Olin et al. | 260—585 B |
| 2,953,601 | 9/1960 | Whitaker | 260—585 B |
| 3,022,349 | 2/1962 | Lemon et al. | 260—585 B |
| 3,270,059 | 8/1966 | Winderl | 260—585 B |

LEWIS GOTTS, Primary Examiner

D. R. PHILLIPS, Assistant Examiner

U.S. Cl. X.R.

260—583 R